United States Patent [19]

Kanda et al.

[11] Patent Number: 5,441,097
[45] Date of Patent: Aug. 15, 1995

[54] HEAT STORAGE TANK EQUIPPED WITH HEAT STORAGE MEMBERS AND FABRICATION PROCESS FOR THE SAME

[75] Inventors: Tetsuo Kanda; Eiji Kawata, both of Kanagawa; Noboru Ikeda, Saitama; Manami Miyazaki, Kanagawa, all of Japan

[73] Assignee: Chiyoda Corporation, Japan

[21] Appl. No.: 242,885

[22] Filed: May 16, 1994

[30] Foreign Application Priority Data

May 19, 1993 [JP] Japan ............................ 5-140045

[51] Int. Cl.⁶ .............................................. F28D 19/00
[52] U.S. Cl. ................................. 165/10; 165/104.11; 62/59; 62/430
[58] Field of Search ............... 165/10, 104.11; 62/430, 62/59

[56] References Cited

U.S. PATENT DOCUMENTS 4,827,735 5/1989 Foley ..................... 62/430
5,036,904 8/1991 Kanda et al. ............. 62/430

FOREIGN PATENT DOCUMENTS

149891 8/1985 Japan ..................... 165/10

*Primary Examiner*—A. Michael Chambers
*Attorney, Agent, or Firm*—Lorusso & Loud

[57] ABSTRACT

A heat storage tank in which heat storage and heat discharge operations are carried out through heat-exchange between heat storage agent and heat transfer medium to store electric power as latent heat, including plural heat storage members which are arranged in a fill-up state in the heat storage tank, each heat storage member holding therein the heat storage agent which alternately repeats latent heat storing and discharging operations through solid-liquid phase variation thereof, and comprising an elongated hollow container formed of material which can keep itself in a hollow shape. The heat storage members are arranged with their open end portions faced up and so as to be spaced from one another at such an interval that the heat transfer medium can flow through gaps between neighboring heat storage members, then the heat storage agent is supplied through the open ends into the heat storage members, and then the heat transfer medium is supplied into the heat storage tank. Each heat storage member is provided with a spacer at least one position on its peripheral surface, and the heat storage members are fixedly assembled and bundled through the spacers thereof. These bundles of the heat storage members are arranged in a fill-up state in the heat storage tank.

15 Claims, 9 Drawing Sheets

HEAT STORAGE TANK EQUIPPED WITH HEAT STORAGE MEMBERS AND FABRICATION PROCESS FOR THE SAME

BACKGROUND OF THE INVENTION

1. Field of the Invention

This invention relates to a latent heat storage tank equipped with a latent heat storage member, and more particularly to a latent heat storage tank equipped with a latent heat storage member having an open upper end portion, which can keep itself in a hollow cylindrical shape and holds therein heat storage agent which alternately repeats latent heat storage and discharge operations through solid-liquid phase variation.

2. Description of Related Art

Recent propagation of electric equipments have caused remarkable increase in power consumption. The power consumption in the daytime (hereinafter referred to as "daytime power consumption") trends to be further increased due to propagation of air-conditioners, OA (Office Automation) equipments, etc. On the other hand, the power consumption at night (hereinafter referred to as "night-time power consumption") has not be so much increased. Therefore, the difference between the daytime power consumption and the night-time power consumption is increased more and more.

Most of power plants are constructed to meet the daytime power consumption, that is, to generate electric power corresponding to the daytime power consumption, and thus most of the power plants are left inoperative at night because the night-time power consumption is small. In view of the foregoing, there have been developed various kinds of heat storage techniques in which heat is stored as latent heat using inexpensive night-time electric power and the stored heat power is used in the daytime to thereby reduce the expensive daytime power consumption.

For example, as one of the techniques is known an ice latent heat storage method which was previously proposed by the applicant of this invention in U.S. Pat. No. 5,036,904 (corresponding Japanese applications: Japanese Laid-open Patent Application No. 4-73532 and Japanese Laid-open Patent Application No. 3-175222). These ice latent heat storage techniques can be implemented in a simple manner and at a low cost, and these techniques are applicable to even an existing building (structure) when the building has a tank or the like which can be reconstructed to a prescribed latent heat storage tank. Accordingly, these techniques are sufficiently practically usable.

Conventional heat storage tanks containing the latent heat storage tank as proposed above are basically designed and used on the assumption that heat storage agent is used while enclosed in a latent heat member (container) which is installed in the heat storage tank. For example, as disclosed in U.S. Pat. No. 5,036,904, a tube for holding heat storage agent therein is disposed in the latent heat storage tank with both ends thereof closed. Therefore, these techniques require the following working for fabrication of heat storage members. That is, a heat storage member is filled with heat storage agent (and weights are added into the heat storage member if necessary), and then it is sealed. Thereafter, a plurality of heat storage members as described above are disposed in a heat storage tank in such a prescribed manner that they are assembled in a net or bundled.

However, the above working needs a long time and a large labor even when the fabrication of the heat storage members are performed at a set-up position in a heat storage tank where the heat storage members are set up. On the other hand, when the fabrication of the heat storage members are performed at a position other than the set-up position in the heat storage tank and the heat storage members are transported to the set-up position, there occur various troubles such as damages, etc. during a transport time, and there also occurs a problem in transport manner. In addition, it becomes apparent through practical use that a working efficiency is remarkably low and thus this method is not effective. Further, since the heat storage agent and the weights are beforehand introduced into the heat storage members, much labor must be given to handle the heat storage members without damage when these heat storage members are set up in the heat storage tank. Therefore, it is also apparent that the working efficiency in this manner would be clearly further reduced.

SUMMARY OF THE INVENTION

In view of problems in working efficiency, etc. which have been found out when the conventional heat storage techniques such as the ice latent heat storage technique, etc. as described above are practically used, this invention has an object to provide a more practically usable latent heat storage tank which is equipped with a heat storage member for holding heat storage agent having solid-liquid phase variable property such as water, salt-containing solution or the like, and by which a working efficiency for fabrication works of a heat storage tank, such as a work of mounting the heat storage member in the heat storage tank, etc. can be effectively increased.

In order to attain the above object, according to this invention, a heat storage tank having inlet and outlet ports for heat transfer medium for heat exchange which is circulated in the heat storage tank and heat-exchanged at the outside of the heat storage tank, includes a plurality of heat storage members which are filled up and arranged (i.e., arranged in a fill-up state) in the heat storage tank, each heat storage member having one closed end portion and the other open end portion. The heat storage member can hold therein heat storage agent which alternately repeats latent heat storing and discharging operations through its solid-liquid phase variation, and it comprises an elongated (longitudinal) hollow container (for example, a pipe-shaped member) formed of material which can keep itself in a hollow shape. In a fabrication process of the heat storage members, the plural heat storage members are arranged in the fill-up state with the open end portions thereof faced up so as to be spaced from one another at such an interval that the heat transfer medium can flow through gaps between the neighboring heat storage members. Thereafter, the heat storage agent is introduced through the open end portions of the heat storage members into the hollow containers of the heat storage members, and then the heat transfer medium is supplied into the heat storage tank.

As a preferable mode of the heat storage tank according to this invention, spacer means may be provided at one or more positions on the outer periphery of each of the hollow containers of the heat storage members which are arranged in the fill-up state, thereby forming a gap interval between neighboring heat storage members. The spacer means preferably comprises a projection formed on the outer peripheral wall of each hollow container. Further, the projections formed on the outer peripheral portions of the heat storage members are preferably connected to one another to thereby unify these heat storage members, so that the unified heat storage members are integrally and arranged in the fill-up state in the heat storage tank. Still further, the spacer means preferably comprises a rectangular plate member having two or more through holes, and the hollow containers of the heat storage members are engaged with the through holes to be unified, so that the heat storage members are arranged in the fill-up state while unified by the plate member. Still further, the projections provided on the outer peripheral walls of the hollow containers of the heat storage members may be formed at the lower portions thereof to extend continuously downwardly.

As another preferable mode of the heat storage tank according to this invention, a plurality of hollow containers of heat storage members are arranged in the fill-up state in a heat storage tank so that they are spaced from one another at intervals and the closed end portions thereof are fixed to the surface of the same horizontal plate.

As another preferable mode of the heat storage tank according to this invention, a plurality of the elongated hollow containers of the heat storage members are juxtaposed with one another on a flat plane so that the open end portions and the closed end portions thereof are aligned in the same direction. These hollow containers of the heat storage members are fixedly assembled into a container assembly by linking these containers to one another at at least one position on the peripheral surfaces thereof by a rope-like member. A plurality of container assemblies thus formed are further fixedly bundled into a heat storage member bundle by a rope-like member and then arranged in the fill-up state in the heat storage tank. In this case, it is preferable that a plurality of heat storage member bundles are arranged in the fill-up state in the heat storage tank in a state where a rope-like member for fixing a heat storage member bundle is linked to a rope-like member for fixing another heat storage member bundle.

As another preferable mode of the heat storage tank according to this invention, an over-cooling inhibitor is kept in the heat storage members.

As another preferable mode of the heat storage tank according to this invention, weights are provided inside and/or outside of the heat storage members.

According to this invention, elongated hard hollow containers each of which has an open top and a closed bottom and can keep itself in a hollow container shape, are arranged in the fill-up state in a heat storage tank as heat storage members for holding therein heat storage agent which alternately repeats the latent heat storage and the latent heat discharge through its solid-liquid phase variation before the heat storage agent is introduced into the containers, and thereafter the heat storage agent and weights (if necessary) are introduced into the thus-arranged containers of the heat storage members. Therefore, the introduction of the heat storage agent and the weights into the heat storage members and the holding of these elements in the heat storage members can be easily and simply performed. The heat transfer medium which is circulated between the heat storage tank and an external heat exchanger is supplied to the inner portion of the heat storage tank, that is, the outside of the containers of the heat storage members to perform heat exchange.

As described above, according to the heat storage tank of this invention, the labor which is required to perform the fill-up arrangement of the containers serving as the heat storage members and the fabrication of the heat storage members to hold the heat storage agent and the weights in the heat storage members can be remarkably reduced, and the working efficiency for industrial use can be improved. At the same time, since fabrication of the heat storage tank as well as fabrication of the heat storage members can be simplified, the whole working efficiency is more improved, and thus practical use is also extremely improved.

Further, each of the heat storage members has an open end, so that even in a case where heat storage agent such as water, solution containing any kind of salt is fully filled in the heat storage member, there occurs no trouble due to cubical expansion through solidification of the heat storage agent. Further, even when the heat storage agent leaks from the heat storage members through the open ends thereof at the time of solidification of the heat storage agent, an effect of the leakage of the heat storage agent on the solid-liquid phase variation of the heat storage agent can be suppressed by beforehand setting the concentration of the heat transfer medium in the heat storage tank to a higher value.

Further, according to the heat storage tank of this invention, the heat storage members are arranged in the fill-up state in the heat storage tank so as to be spaced from one another at gap intervals, so that the heat transfer medium held in the heat storage tank can uniformly flow through the whole tank without being locally trapped to thereby enable a heat storage operation such as a heat-exchange operation, etc. to be smoothly performed. Therefore, in this invention, a higher heat storage efficiency can be obtained.

By providing spacer means on the outer peripheral surface of the heat storage members, the heat storage members can be disposed in the heat storage tank in an individually independent arrangement or in an assembly arrangement.

Various kinds of manners are usable as the spacer means. For example, the following manner may be used. That is, a plurality of hollow containers of heat storage members are beforehand juxtaposed with one another on a flat plane so that gaps through which the heat transfer medium can flow are formed between neighboring heat storage members, and these hollow containers are linked to one another into an assembly by a string member such as a rope, a band member or the like. Thereafter, this heat storage member assembly comprising the linked heat storage members is arranged in the heat storage tank. This manner is preferable because it can simplify transport of the heat storage members to a set-up position and arrangement of the heat storage members in the heat storage tank.

Further, by rolling or bundling the above flat assembly of the linked heat storage members into a heat storage member assembly bundle, it can be easily disposed to stand in the heat storage tank. Therefore, the working for the fill-up arrangement of the heat storage members in the heat storage tank is more simplified and smoothed.

Still further, a plurality of heat storage member bundles thus formed are linked to one another by a bundle fixing rope in a state where they are arranged in the fill-up state in the heat storage tank, and thus the arrangement of the heat storage members can be stabilized.

DESCRIPTION OF PREFERRED EMBODIMENTS

Preferred embodiments according to this invention will be described with reference to the accompanying drawings, however, this invention is not limited to the following embodiments.

Figure 1:
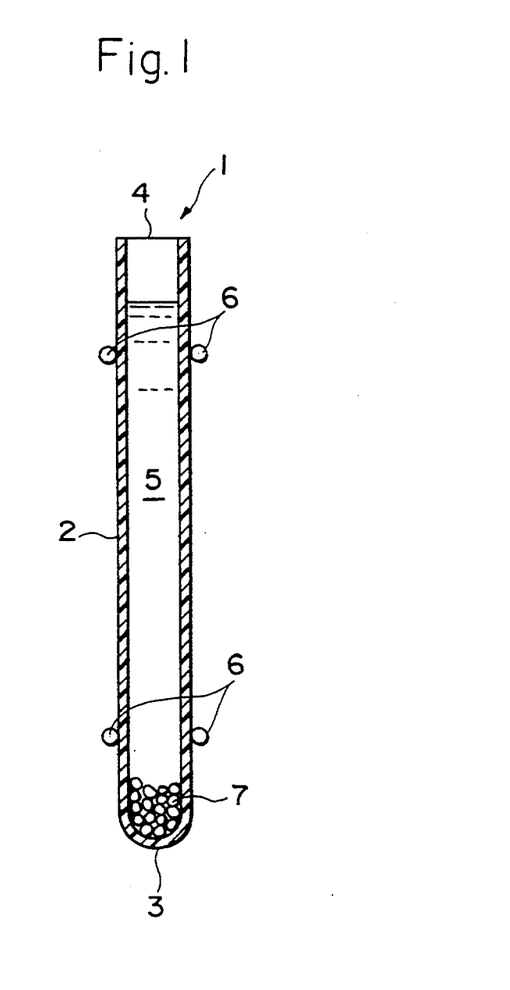
FIG. 1 is a cross-sectional view showing an embodiment of a heat storage member according to this invention.
Figure 2:
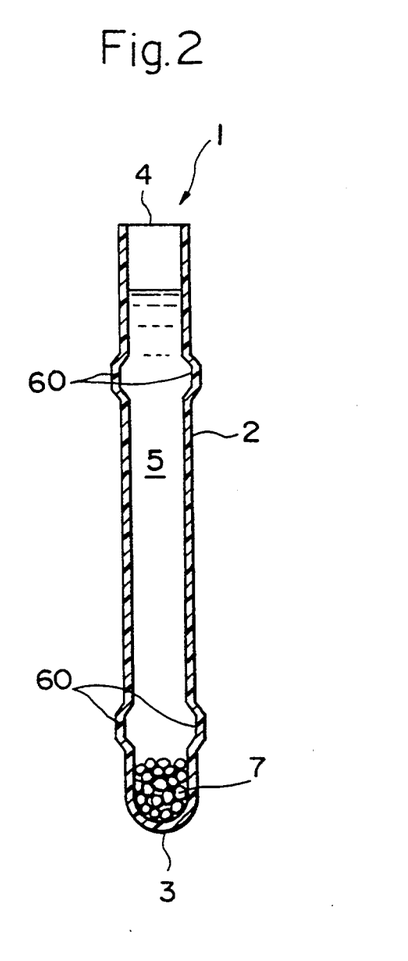
FIG. 2 is a cross-sectional view of another embodiment of the heat storage member according to this invention.
Figure 3:
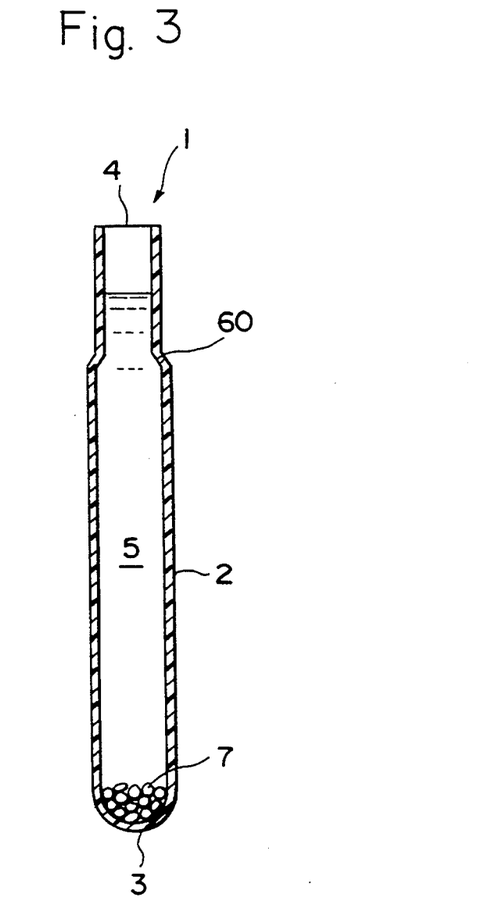
FIG. 3 is a cross-sectional view of another embodiment of the heat storage member according to this invention.

FIG. 1 is a cross-sectional view of an embodiment of a heat storage member according to this invention, FIG. 2 is a cross-sectional view of another embodiment of the heat storage member according to this invention, and FIG. 3 is cross-sectional view of another embodiment of the heat storage member according to this invention.

In FIG. 1, a heat storage member 1 comprises an elongated hard hollow container (pipe-shaped member) 2 having two ends, one of which is closed and serves as a bottom 3, and the other of which is opened and serves as an open end 4. The heat storage member 1 is designed so that heat storage agent 5 is introduced through the open end 4 and held in the heat storage member 1. The bottom portion 3 of the closed end may be designed in a curved shape as shown in FIG. 1, in a straight shape such as a tooth paste tube bottom end, or in a flat plate shape.

The elongated hollow container according to this invention may be designed in any sectional shape such as a circle, an ellipsoid, a triangle, a rectangle, a polygon, a star shape or the like, and it is not limited to specific shapes. Usually, the container is designed to be circular in section. The inner and outer diameters, the length, etc. of the container may be suitably determined in accordance with the size of the heat storage tank. Generally, the equivalent diameter of the container is set to 10 to 80 mm, preferably 20 to 40 mm, and it is usually set to about 30 mm. The length of the container is set to 500 to 10000 mm, preferably 1000 to 3000 mm, and it is usually set to about 2000 mm. The thickness of the container is set to 0.1 to 2.0 mm, and it is usually set to about 0.5 mm.

Any material may be used for the elongated hollow container 2 insofar as it has heat resistance of about $-20°$ to $60°$ C. and it can keep itself in a hollow-container shape which has excellent low-temperature characteristics. For example, any material of metals such as aluminum, stainless steel, etc. and synthetic resins such as polyethylene (PE), polypropylene (PP), polyethylene terephthalate (PET), polycarbonate, etc. may be selected in consideration of processing conditions such as thickness, length, shape, etc. of the heat storage member. Preferably, a high density polyethylene polymerized at low pressure having density of $0.941 \sim 0.965$ g/cm$^3$, softening point of $124° \sim 127°$ C., tensile strength of $245 \sim 335$ kg/cm$^2$, and break elongation of $25 \sim 100\%$ is used.

Further, it is preferable that one or two projecting spacers 6 are mounted at any position on the outer peripheral portion of each elongated container, and it is more preferable that the spacers 6 are provided at two positions, that is, upper and lower portions of the elongated container 2. The spacer 6 serves to form gaps between respective neighboring heat storage members which are arranged in a fill-up state in the heat storage tank so that heat transfer medium can uniformly flow through the heat storage tank.

The spacer 6 may be formed merely by winding a string or band member of resin, metal, wood or other material around the outer peripheral portion of the elongated container 2, or by engaging a rubber ring member with the elongated container 2.

Further, the elongated container 2 of the heat storage member may be designed to be partially projected at the peripheral portion thereof as shown in FIG. 2 so that the projecting portions are used as spacers 60. Still further, the elongated container 2 of the heat storage member may be designed so that the outer diameter at the lower portion of the heat storage member is continuously larger from a prescribed position on the outer periphery thereof than that at the upper portion of the heat storage member as shown in FIG. 3, and the lower portion of the heat storage member is used as a spacer 60. That is, the elongated container 2 is constructed by a head portion and a body portion, and the body portion is designed to be larger in diameter than the head portion. The body portion is used as the spacer 60.

The spacer 6 or 60 may be projectingly designed in a flat (horizontal) ring shape, in a slant ring shape or in a spiral shape on the peripheral surface of the elongated container 2. In FIGS. 2 and 3, the same elements as shown in FIG. 1 are represented by the same reference numerals.

No restriction is imposed on the spacers 6 and 60, particularly on the size and shape of the projections thereof, and these factors may be suitably determined in accordance with total smoothness of flow of the heat transfer medium through the heat storage tank, a solidification rate of the heat storage agent, etc. Usually, the spacer is designed in a horizontal ring shape under a condition that the thickness of the spacer is set to about 0.2 to 2 mm, preferably about 0.3 to 1 mm, and the width of the spacer is set to about 10 to 100 mm, preferably about 20 to 50 mm.

In FIGS. 1 to 3, weights 7 are provided in the container 2. The weight is not indispensable to this invention, however, it is preferable because it prevents the heat storage members from falling down in the heat transfer medium. The weights may be disposed not inside of the heat storage members, but also outside of the heat storage members. Further, the weights are not necessarily required to be provided to an individual heat storage member, but may be collectively provided to a heat storage member assembly comprising a group of plural heat storage members as described later. For example, it may be adopted that the spacer is also used as a weight, and a projection is formed of metal on the outer peripheral surface of the elongated container. Further, the weights may be fixed to the heat storage members at the same time when a rope-like member is wound around the heat storage members. Still further, the weights may be fixedly disposed at the same time when a heat storage member assembly is formed, or the weights may be mounted to the heat storage member assembly while suspended by the heat storage member assembly.

If particle members are introduced as weights into the storage members, they can act as an inhibitor for over-cooling of the heat storage agent. Usually, fine particles such as sand, clay or the like are preferably used. As described above, the weights are not indispensable, however, the weight thereof may be suitable determined in accordance with buoyancy of the heat storage members or the heat storage member assembly. Usually, when the fine particles are introduced into each heat storage member, the weight per heat storage member is set to about 50 to 200 g.

Figure 4:
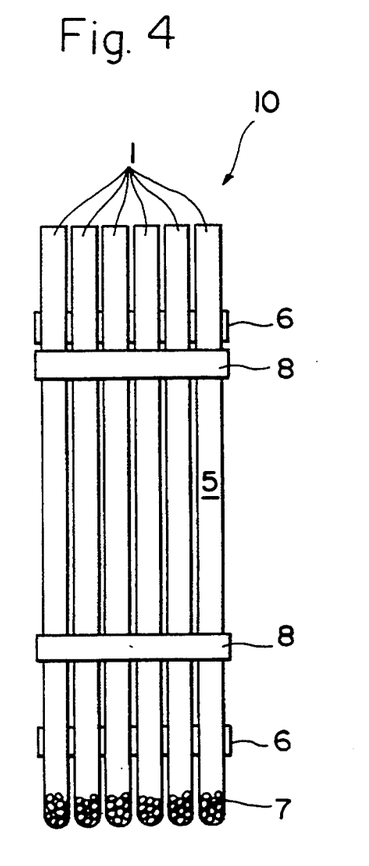
FIG. 4 is a cross-sectional view of an embodiment of a heat storage member assembly according to this invention.

FIG. 4 is a cross-sectional view showing an embodiment of a heat storage member assembly comprising plural heat storage members.

In FIG. 4, the respective heat storage members 1 are disposed adjacently to one another through spacer means 6 which are provided at the upper and lower portions of each heat storage member 1, and bundled into a heat storage member assembly 10 by two bundling bands 8. Any member may be used as the bundling band 8 insofar as a predetermined number of heat storage members can be stably bundled by it, and no restriction is imposed on the disposing position, number, shape, etc. of the bundling bands. For example, a general rope or band, an elastic member such as rubber, a frame of synthetic resin or metal which is designed to bundle prescribed heat storage members or the like may be used. Usually, a rope or an elastic rope-like member is used.

The material of each of the heat storage members constituting the heat storage member assembly according to this embodiment is not limited to a specific one. When the bottom portion at the closed end of each heat storage member is designed in a curved shape, at least three heat storage members are required to be bundled into an assembly in order to enable the heat storage member assembly to stand in the heat storage tank. Usually, heat storage members of 20 to 400, preferably 30 to 100 are bundled into a heat storage member assembly.

For each heat storage member 1 of the heat storage member assembly 10 shown in FIG. 4, like the first embodiment as described above, the heat storage agent 5 is introduced through the open ends of the heat storage members, and fine-particle weights 7 which are also used as an over-cooling inhibitor are also introduced and held in the heat storage members.

In the above embodiment, the heat storage member assembly of this invention is formed by bundling a plurality of heat storage members with a bundling band as described above. In place of this manner, various manners for bundling a plurality of heat storage members into an assembly may be used. In the following various embodiments, no restriction is imposed on the method of forming a heat storage member assembly and the bundling manner for bundling heat storage members, and any manner may be adopted insofar as it provides gaps between neighboring heat storage members through which the heat transfer medium can flow.

Figure 5:
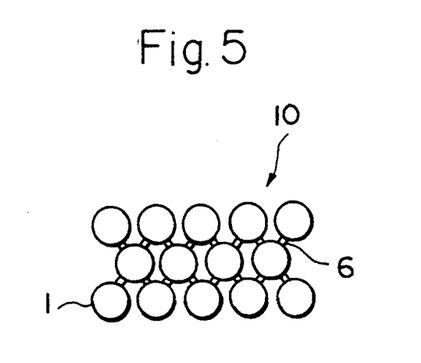
FIG. 5 is a top view of another embodiment of the heat storage member assembly according to this invention.
Figure 6:
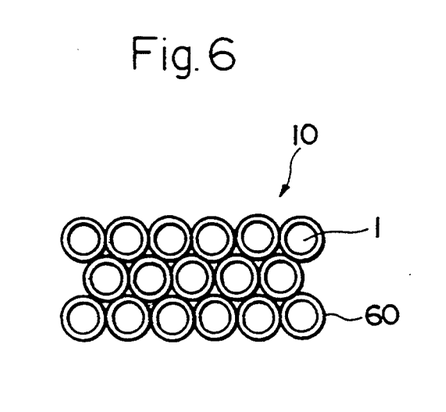
FIG. 6 is a top view of another embodiment of the heat storage member assembly according to this invention.
Figure 7:
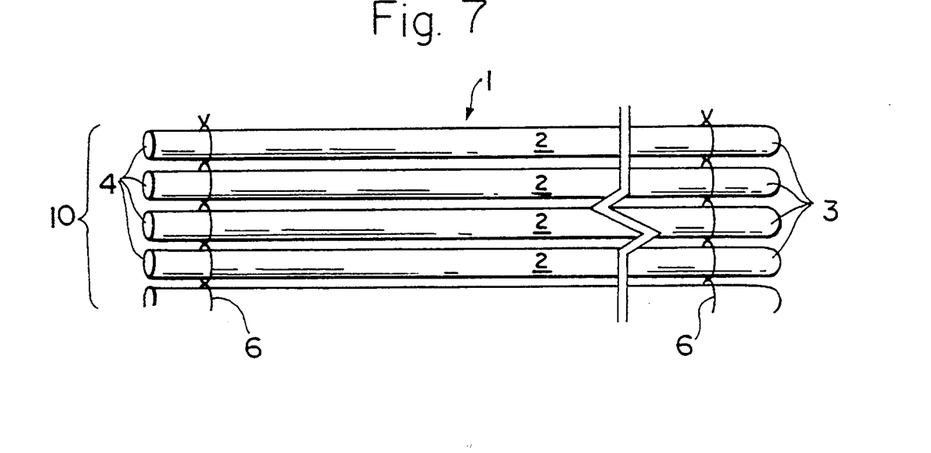
FIG. 7 is a schematic view showing an arrangement of the heat storage member assembly according to this invention.
Figure 8:
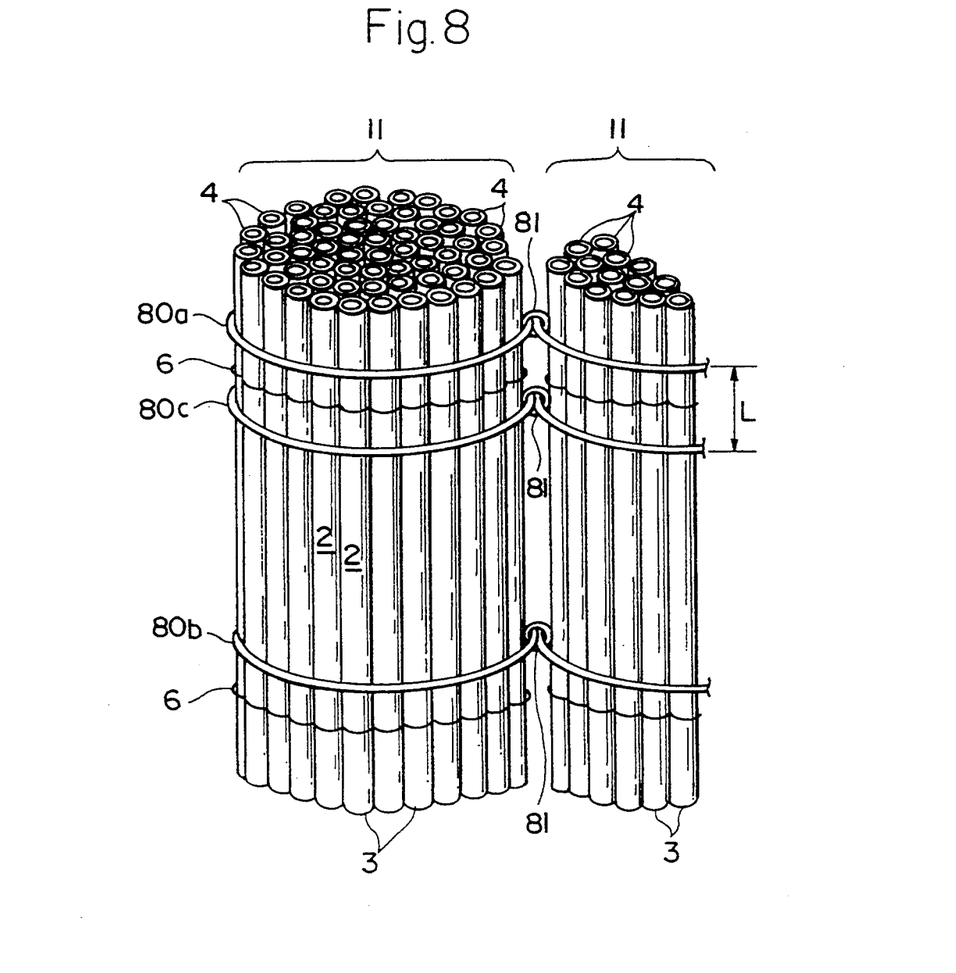
FIG. 8 is a schematic view showing an arrangement of a bundle of the heat storage member assemblies according to this invention.
Figure 9:
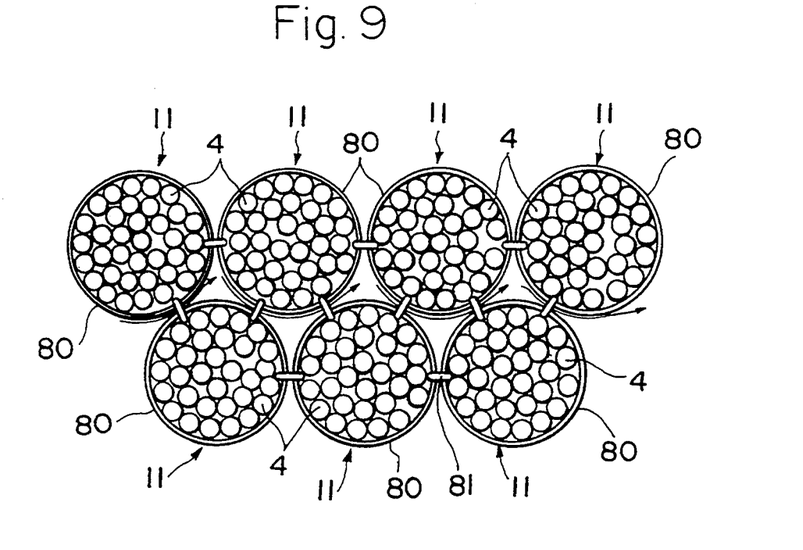
FIG. 9 is a top view showing an arrangement of the heat storage member assemblies of the heat storage members shown in FIG. 2.

FIG. 5 is a top view of another embodiment of the heat storage member assembly according to this invention, and FIG. 6 is a top view of another embodiment of the heat storage member assembly according to this invention. FIG. 7 is a schematic view showing an arrangement of the heat storage member assembly according to this invention, and FIG. 8 is a schematic view showing an arrangement of a bundle of the heat storage member assemblies according to this invention. FIG. 9 is a top view showing an arrangement of the heat storage member assemblies of the heat storage members shown in FIG. 2.

In the embodiment shown in FIG. 5, spacers 6 are suitably provided to the heat storage member assembly 10 so that prescribed gaps are formed between the neighboring hollow containers of the heat storage members 1. In this case, the spacers 6 may be formed of minute material, or may be pipe-shaped.

The heat storage member assembly 10 shown in FIG. 6 comprises heat storage members 1 as shown in FIG. 3 which are bundled in a closest packing state. Each of the heat storage members has a cylindrical shape (pipe-like shape) in which a projecting lower portion thereof, serving as a spacer 60, is designed to be continuously larger in diameter than an upper portion thereof. When the heat storage members are linked to one another at connection points between the projections, gaps are formed at the connection points, and the heat transfer medium can flow the gaps between the upper portions of smaller diameter.

The arrangements of the heat storage members shown in FIGS. 5 and 6 may be performed by suitably linking the heat storage members to one another, or by integrally molding the heat storage members with synthetic resin.

The heat storage member assembly as shown in FIGS. 4, 5 and 6 can stand in the heat storage tank even when the closed end bottom portions of the heat storage members are designed not to be flat, but to be curved, so that the heat storage member assembly can be easily arranged in the fill-up state in the heat storage tank.

The arrangement of the heat storage members shown in FIG. 7 is obtained as follows. That is, a plurality of hollow containers 2 are arranged so that open ends 4 and closed bottom portions 3 thereof are aligned with one another in the same direction, and linked to one another in a blind-shaped arrangement by a rope-like member 6 serving as both of a bundling band and a spacer to bundle the heat storage members in juxtaposition with one another on a plane and form a heat storage member assembly 10. The same number of heat storage members as described above are used in this embodiment. However, the number of heat storage members to be used is not limited to a specific one, and it may be varied. Usually, heat storage members of about 50 to 100 are used to form a heat storage member assembly.

No restriction is imposed on the arrangement of the linked heat storage members constituting the heat storage member assembly, and any arrangement may be adopted insofar as the heat storage members are juxtaposed with one another on a plane. For example, by regarding as wefts the elongated hollow containers which are arranged like a blind, the heat storage members may be linked to one another like plain fabrics as shown in FIG. 7. Alternately, the heat storage members may be linked in juxtaposition with one another while winding each of the heat storage members with a rope-like member. At any rate, any manner for linking the heat storage members may be suitably selected. When the heat storage members are linked to one another by the rope-like member, the linkage may be made at at least one position of each heat storage member insofar as the hollow containers of the heat storage members are not disjointed, however, it is preferable to link one heat storage member to another at the upper and lower portions thereof. Of course, the linkage may be made at three or more positions of each heat storage member.

The diameter of the rope-like member is preferably set to 0.5 to 2 mm. Any material may be used for the rope-like member insofar as it has heat resistance of about −20° to 60° C. and it can be formed in a string shape. For example, various kinds of metals such as aluminum, etc. and various kinds of synthetic resins such as polyethylene, etc. may be suitably selected.

The heat storage member assembly 10 arranged on a plane may be disposed in a side direction of the heat storage tank while its flat shape is kept, however, it is preferable that the heat storage member (elongated container) assembly 10 is rolled (bundled) in a circular or elliptical pillar shape, fixedly wound by a rope 80a like the linking rope-like member as described above, and then disposed as a heat storage member assembly bundle 11 in the heat storage tank, as shown in FIG. 8. The bundled or rolled heat storage member assembly may be fixedly wound at any position by the rope 80a, and it may be fixedly wound at at least the center of the axis direction of the rolled heat storage member assembly. Usually, the following rope-fixing position is preferable. That is, as shown in FIG. 8, the ropes 80a and 80b are wound around the heat storage member assembly bundle 11 at the upper and lower portions thereof and at positions which are higher than the fixing positions of the upper and lower rope-like members 6 for linking the elongated hollow containers 2 to one another, respectively. In addition, a rope 80c is further wound around the heat storage member assembly bundle 11 at a position which is lower than the fixing position of the upper rope-like member 6 and is away from the upper rope 80a by a distance L of about 3 to 100 mm. In this case, the flow of the heat transfer medium can be easily and smoothly performed in the heat storage tank, particularly in a region corresponding to the upper portions of the elongated hollow containers, so that the phase variation of the heat storage agent in the elongated hollow containers 2 can be uniformly made over the whole space of each elongated hollow container 2. In this case, the fixedly winding rope is designed to be thicker than the rope-like member 6, and it is preferably set to about 5 to 20 mm in diameter.

As described above, the heat storage member assembly is wound by the rope and the linking rope-like member and the winding rope are designed to have different thickness (diameter) from each other. Therefore, the flow of the heat transfer medium flowing in the heat storage tank is divided into a big mainstream which mainly flows in a horizontal direction, that is, in a direction perpendicular to the axial direction of the heat storage member assemblies (as indicated by an arrow of FIG. 9) in the heat storage tank, and a tributary which mainly flows in a vertical direction, that is, upwardly and downwardly along the axial direction of the heat storage member assemblies in the heat storage tank. Therefore, there occurs no dead zone of the flow of the heat transfer medium in a heat transfer medium path.

As shown in FIG. 9, a plurality of heat storage member assembly bundles each of which is fixedly wound by the rope as described above are arranged in a fill-up state in the heat storage tank. In this case, the ropes 80 (ropes 80a, ropes 80b and ropes 80c) which are fixedly wound around the heat storage member assembly bundles and are located at the same height are jointed to one another with ring-shaped strings 81 to link the neighboring heat storage member assembly bundles 11 to each other as shown in FIG. 8. The respective heat storage member assembly bundles are supported by one another, so that they can stand stably in the heat storage tank. A well know material such as metal, synthetic resin or the like may be used for the strings for linking the heat storage member assembly bundles.

Figure 10:
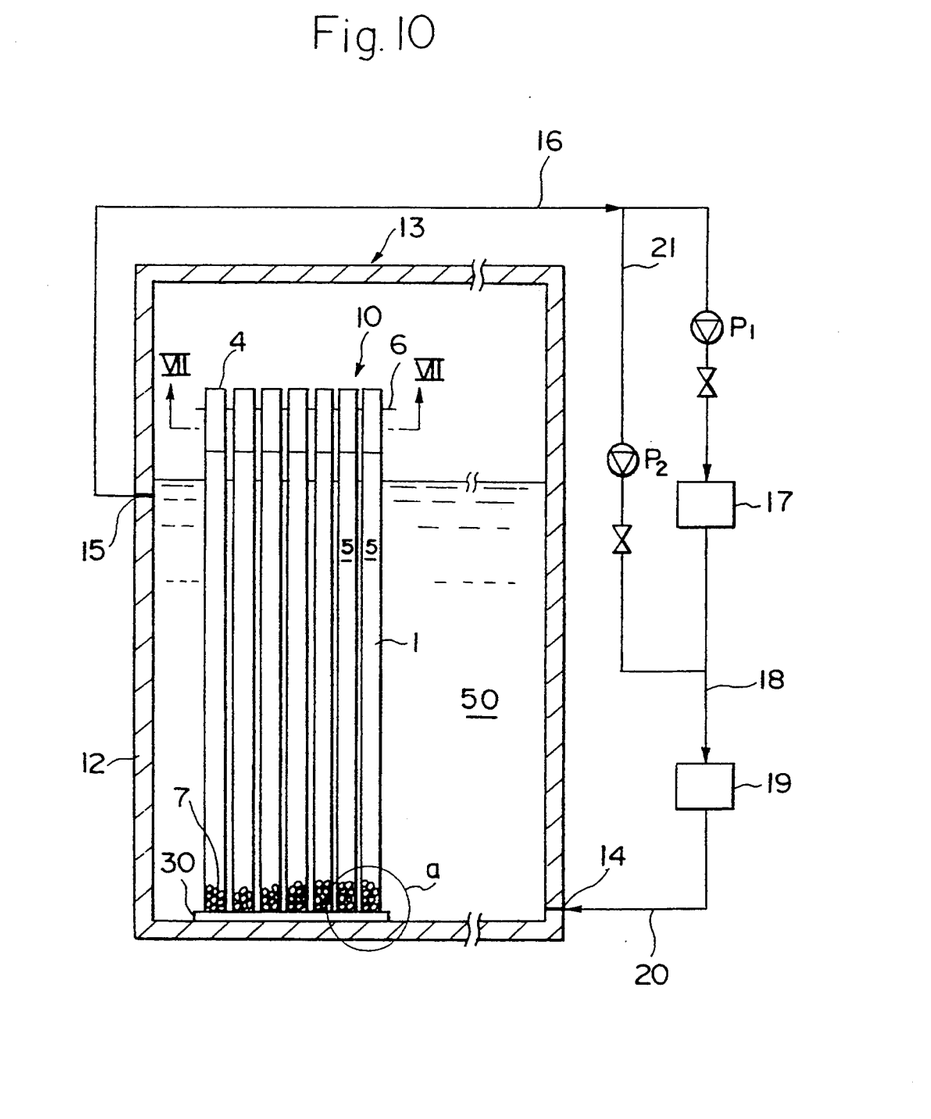
FIG. 10 is a schematic view showing an embodiment of a heat storage device in which a heat storage tank according to this invention is installed.
Figure 11:
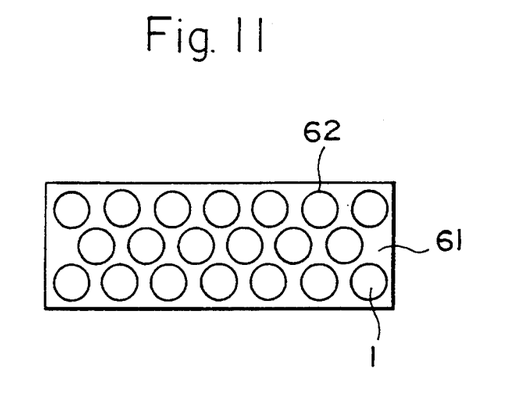
FIG. 11 is a cross-sectional view of the arrangement of the heat storage members shown in FIG. 10, which is taken along a line VII—VII.
Figure 12:
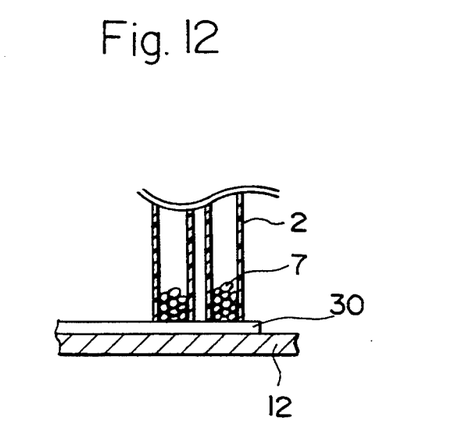
FIG. 12 is an enlarged view of a portion a of FIG. 10.

FIG. 10 shows an embodiment of a heat storage device in which the heat storage tank according to this invention is installed. In FIG. 10, another embodiment of the heat storage member assembly is shown in cross-sectional view, and an arrangement of the heat storage member assembly in the heat storage tank is shown in cross-sectional view. FIG. 11 is a cross-sectional view of FIG. 10, which is taken along a line VII—VII, and shows a spacer plate. FIG. 12 is an enlarged view of a portion a of FIG. 10.

In this embodiment, the heat storage members are linked to one another through a spacer plate 61 as shown in FIG. 11. The spacer plate 61 is formed with through holes 62 which are arranged at suitable intervals as shown in FIG. 11. The respective heat storage members are engagedly inserted into the through holes 62, and the bottom portions of the container walls of the heat storage members are jointed to a flat plate 30 to thereby form closed ends. That is, a predetermined number of heat storage members are fixed through the same spacer plate 61 and the same bottom plate 30 while erected and spaced from one another at the interval corresponding to the interval of the through holes 62, thereby forming a heat storage member assembly 10. Like the embodiment as described above, heat storage agent 5 and weights 7 are introduced into the heat storage members constituting the heat storage member assembly 10.

The spacer plate and the bottom flat plate may be formed of the same material as the heat storage members, for example, synthetic resin, metal or the like. The heat storage members, the spacer plate and the bottom flat plate may be formed of the same material or different materials. The same material is preferably used for the heat storage members and the bottom flat plate in order to easily joint these elements. For example, when the heat storage members and the bottom flat plate are formed of polyethylene or the like, these elements can be easily jointed by ultrasonic wave or the like in a simple operation.

The size of the spacer plate and the bottom flat plate is not limited to a specific one, and any size may be selected in accordance with the size of a heat storage tank, the size of a carry-in port, etc. In consideration of the size of a manhole which is provided to a general heat storage tank, a flat plate of 30 cm × 30 cm square is usually used.

The heat storage member assemblies 10 thus formed are successively disposed at the bottom portion of the heat storage tank 13 which is surrounded by peripheral walls 12, and these assemblies 10 can be arranged in a fill-up state until a solid fill rate of the heat storage agent (a fill rate when the heat storage agent is solidified) reaches about 70%. Thereafter, the heat storage agent 5 and fine-particle weights 7 serving as an over-cooling inhibitor are introduced into the heat storage assemblies 10.

In this invention, as the heat storage agent may be selectively used solid-liquid phase variable materials. Water, a solution containing water as main ingredient such as a solution contaminated with antiseptics, ethylene glycol or the like is usually used, however, paraffine may be used. The heat storage agent 5 may be fully filled in the heat storage members until it overflows, or may be filled in the heat storage members so that there remains a vacant space corresponding to a volume increasing when the heat storage agent cubically expands at its solidification time. Usually, the heat storage agent is fully filled in the heat storage members, and the concentration of the heat transfer medium in the heat storage tank is set to a higher value so that there occurs no trouble in a heat storage operation even when the heat storage agent overflows the heat storage tank.

As described above, the heat storage agent 5 and the weights 7 are introduced into the heat storage members of each of the heat storage member assemblies 10 which are arranged in the fill-up state in the heat storage tank 13, and then the heat transfer medium is supplied through a heat transfer medium inlet port 14 into the heat storage tank 13 so that the heat transfer medium 11 is kept at a lower position than the liquid surface of the heat storage agent in the heat storage members 1. Any material may be suitable selected for the heat transfer medium in accordance with the kind of used heat storage agent. Usually, ethylene glycol, propylene glycol, solution of calcium chloride, or the like is used.

Figure 13:
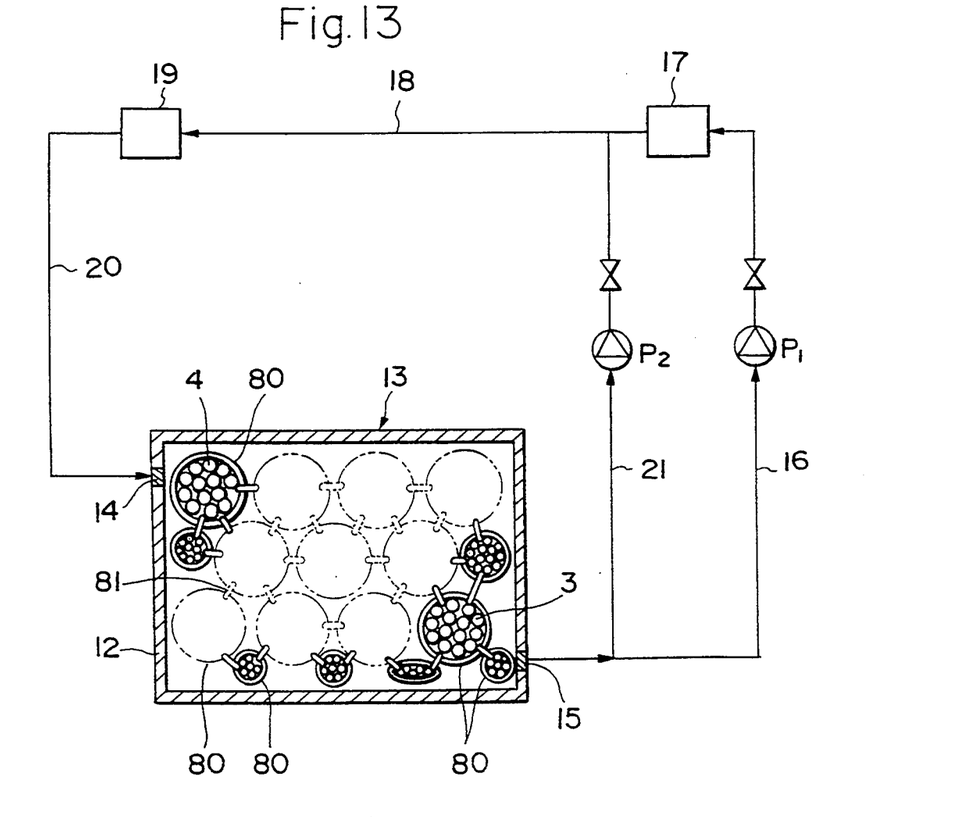
FIG. 13 is a schematic view of another embodiment of the heat storage device in which the heat storage tank according to this invention is installed.

FIG. 13 shows another embodiment of the heat storage device in which the heat storage tank of this invention is installed. In FIG. 13, an arrangement of the heat storage member assemblies shown in FIGS. 7 to 9 in the heat storage tank is shown in cross-sectional view.

In FIG. 13, the heat storage member assembly bundles 11 as described above are successively at the bottom portion of the heat storage tank 13 which is surrounded by the peripheral walls 12, and can be arranged in a fill-up state until the solid fill rate of the heat storage agent reaches about 70% or more. The respective heat storage member assembly bundles 11 are not necessarily required to be identical to one another and to be uniform. Further, the number of heat storage members constituting the heat storage member assembly bundle is not limited to a fixed value, and the size of the heat storage member assembly bundle and the number of heat storage members constituting the bundle may be freely determined in accordance with the size, shape, etc. of the heat storage tank. Still further, it is not necessary to dispose only the heat storage member assembly bundles in the heat storage tank, but it may be adopted that the heat storage members alone or a group of several heat storage members linked to one another are filled alone in gaps between the heat storage member assembly bundles. That is, the arrangement of the heat storage member assembly bundles may be freely adjusted so that the fill rate of the heat storage members, that is, the solid fill rate of the heat storage agent in the heat storage tank is increased. The other elements are identical to those of FIG. 10.

In the heat storage operation, as shown in FIG. 13, the heat transfer medium 50, which is held in the heat storage tank 13 formed in the above manner, flows through the gaps between the heat storage members while performing heat exchange with the heat storage agent in the heat storage members 1, and flows out through the outlet port 15 to the outside. During the heat discharge operation, the flow-out heat transfer medium 50 is passed through a line 16, a pump $P_1$, an air conditioner 17, a line 18, a chiller 19 and a line 20 to be heat-exchanged, and then circulated into the heat storage tank 13. On the other hand, during the heat storage operation, the flow-out heat transfer medium 50 is passed through a line 21, a pump $P_2$, the line 18, the chiller 19 and the line 20, and circulated into the heat storage tank 13. During the heat discharge operation, the inlet port 14 and the outlet port 15 may be inverted to each other to perform the heat discharge operation in the inverse cycle.

In order to enable the heat transfer medium 50 to uniformly flow over the whole area of the heat storage tank 13, one of the inlet port 14 and the outlet port 15 of the heat storage tank 18 are preferably disposed at an upper or lower portion of the heat storage tank, and the other is disposed at a diagonal position to the above portion. For example, when the inlet port 14 is disposed at the lower portion of the heat storage tank 13, the outlet port 15 is disposed at the upper portion of the heat storage tank 13 as shown in FIG. 13.

According to the heat storage device thus formed, the solid-liquid phase variation of the heat storage agent can be smoothly performed by circulating the heat transfer medium, and electric power can be stored through heat storage and discharged through heat discharge.

As described above, an element such as a float or the like is not required in the heat storage member of this invention by balancing buoyancy with weights, and thus the fabrication of the heat storage tank can be simply and easily performed. Further, as compared with closed-type heat storage members which are floated in the heat transfer medium in the conventional heat storage tank, the transport of the heat storage members to the set-up position of the heat storage tank can be more simply performed, and introduction of the heat storage agent, etc, into the heat storage members can, be easily performed after the heat storage members are arranged in fill-up state in the heat storage tank. Further, the heat storage member can be stably and easily arranged in the fill-up state in the heat storage tank in a simple manner. In addition, gaps can be easily formed between the heat storage members, so that the flow of the heat transfer medium through the heat storage tank can be stabilized and smoothed during the heat storage operation.

According to the heat storage device in which the heat storage tank of this invention is installed, the heat storage agent can contact its solid-liquid phase variation continuously and smoothly, s and the heat storage is performed with night-time inexpensive electric power while the heat discharge is performed in the daytime, thereby suppressing power consumption.

What is claimed is:

1. A fabrication process of fabricating a heat storage tank, comprising the steps of:
   arranging a plurality of heat storage members each having an open end and a closed end in a fill-up state in a heat storage tank so that the open ends of the heat storage members are faced up;
   providing spacers supported on the exterior surfaces of the individual heat storage members with each spacer encircling and conforming to the circumferential contour of the exterior surface so that the heat storage members are spaced from one another at such an interval that heat transfer medium can flow through gaps between neighboring heat storage members;
   introducing heat storage agent through the open ends of the heat storage members into the heat storage members; and
   supplying heat transfer medium into the heat storage tank.

2. The fabrication process as claimed in claim 1, further comprising the steps of:
   juxtaposing the heat storage members with one another on a flat plane so that the open ends and the closed ends thereof are aligned in the same direction; and
   fixedly assembling the juxtaposed heat storage members into an assembly by linking the heat storage members to one another at at least one position on the peripheral surfaces thereof with a rope-like member.

3. The fabrication process as claimed in claim 2, further comprising the step of:
   fixedly bundling a plurality of assemblies into a heat storage member bundle with a rope-like member and arranging the heat storage member bundles in the fill-up state in the heat storage tank.

4. The fabrication process as claimed in claim 3, further comprising the step of:
   connecting a rope-like member for fixing a heat storage member bundle to a rope-like member for fixing another heat storage member bundle so that the heat storage member bundles are fixedly arranged in the fill-up state in the heat storage tank.

5. A heat storage tank having an inlet port and an outlet port for circulation of a heat transfer medium therethrough, said heat storage tank having an interior compartment containing:
   a plurality of individual heat storage members, each of said individual heat storage members having an elongated, hollow body with a closed end, an open end, and wall means defining a hollow interior and an exterior surface having a circumferential contour, each of said heat storage members containing a heat storage agent for alternately and repeatedly storing and discharging latent heat by change of phase between solid state and liquid state, said individual heat storage members being arranged within said interior compartment with their open ends facing upwards and spaced from one another at an interval allowing the heat transfer medium to flow through gaps between adjacent, individual heat storage members; and
   spacers supported on the exterior surfaces of said individual heat storage members to define said gaps, each of said spacers encircling and conforming to said circumferential contour of the exterior surface of the individual heat storage member.

6. The heat storage tank as claimed in claim 5, wherein an over-cooling inhibitor is provided in said heat storage members.

7. The heat storage tank as claimed in claim 5, wherein weights are provided inside and/or outside said heat storage members.

8. A heat storage tank in accordance with claim 5 wherein said spacers are band members, each band member encircling and adhered to the exterior surface of an individual heat storage member.

9. A heat storage tank in accordance with claim 8 wherein each individual heat storage members carries at least two of said band members, one of said band members being located adjacent said open end and another of said band members being located adjacent said closed end, spaced from said one band member.

10. A heat storage tank in accordance with claim 5 wherein said spacers are annular protrusions in said wall means, said annular protrusions being part of and integral with of said wall means.

11. A heat storage tank in accordance with claim 10 wherein each of said individual heat storage members has two of said annular protrusions, a first of said annular protrusions being located adjacent said open end and a second of annular protrusions being located adjacent said closed end and spaced from said first annular protrusion.

12. A heat storage tank in accordance with claim 5 wherein each of said spacers is defined by a portion of an individual heat storage member having an enlarged diameter extending from said closed end to an intermediate point on said exterior surface intermediate said closed end and said open end; and
   wherein each individual heat storage member has a second portion, of a diameter smaller than said first portion, extending from said open end to said intermediate point.

13. A heat storage tank in accordance with claim 5 wherein said spacers are formed by at least one string, said string tying together plural individual heat storage members.

14. A heat storage tank in accordance with claim 5 wherein said spacers include first string means for tying together said plural individual heat storage members at points adjacent said open ends and second string means for tying together said plural individual heat storage members at points adjacent said closed ends.

15. A heat storage tank in accordance with claim 5 wherein said spacers are integrally formed as at least one rectangular plate, said rectangular plate having a plurality of through holes, each through hole having a contour for mating with the exterior surface of an individual heat storage member.

* * * * *

UNITED STATES PATENT AND TRADEMARK OFFICE
CERTIFICATE OF CORRECTION

PATENT NO. : 5,441,097
DATED : August 15, 1995
INVENTOR(S) : KANDA et al

It is certified that error appears in the above-indentified patent and that said Letters Patent is hereby corrected as shown below:

On the Title page, item [75] Inventors:"

after "Kanda" insert --, Yokohama-- and after "Kawata," delete "both of".

Col. 12, line 39, delete "18" and insert --13--.

Col. 13, line 7, delete "s".

Signed and Sealed this

Fourteenth Day of May, 1996

Attest:

BRUCE LEHMAN

*Attesting Officer*     *Commissioner of Patents and Trademarks*